United States Patent [11] 3,620,990

[72] Inventors Stanley M. Hazen
 Cheswick;
 William J. Heilman, Allison Park, both of Pa.
[21] Appl. No. 751,746
[22] Filed Aug. 12, 1968
[45] Patented Nov. 16, 1971
[73] Assignee Gulf Research & Development Company
 Pittsburgh, Pa.

[54] PROCESS FOR THE PRODUCTION OF FOAMED POLYANHYDRIDE COPOLYMERS AND PRODUCTS THEREOF
 13 Claims, No Drawings
[52] U.S. Cl. .................................................... 260/2.5 R,
 260/2.5 N, 260/40 R, 260/41 R, 260/78.5 T, 260/886, 260/873
[51] Int. Cl. ........................................................ C08c 7/08,
 C08d 13/08, C08f 47/10
[50] Field of Search ............................................ 260/2.5 N, 2.5 R, 78.5

[56] References Cited
UNITED STATES PATENTS
| | | | |
|---|---|---|---|
| 3,459,715 | 8/1969 | Gaertner ...................... | 260/78.5 |
| 3,374,209 | 3/1968 | Hay et al...................... | 260/78.5 |
| 3,453,246 | 7/1969 | Heilman ...................... | 260/78 |

Primary Examiner—Murray Tillman
Assistant Examiner—Richard B. Turer
Attorneys—Meyer Neishloss, Deane E. Keith and Richard C. Gaffney ABSTRACT: A flowable composition is provided which is foamable, comprising a solution of
A. a polyanhydride copolymer of
1. a straight chain alpha-olefin having between three and about 20 carbon atoms, and
2. maleic anhydride
B. a liquid monoepoxide, and
C. maleic anhydride.
A curing agent such as a tertiary amine is used to initiate the exothermic reaction between the polyanhydride, the generated heat then serving to cause interaction of the maleic anhydride and the amine, with the evolution of gas and consequent foaming. The composition may be molded during foaming and curing.

PROCESS FOR THE PRODUCTION OF FOAMED POLYANHYDRIDE COPOLYMERS AND PRODUCTS THEREOF

This invention relates to the production of particular foamed resins or plastics, and in which the curing agent for the resin serves the dual purpose of reacting with an added material to cause gas generation at such a rate as to simultaneously cause curing and the formation of a rigid solid foam.

Foamed cellular materials such as polystyrenes, polyurethanes, polyolefins and the like have long been known. Blowing agents such as carbon dioxide, water reacted with the isocyanate in polyurethane prepolymer to give off a gas, trichlorofluoromethane, and various chemical (gas generating) agents have been used. In some cases, highly critical conditions as to amounts, temperatures, agitation, and the like are involved to avoid splitting, overly large cells, weak foams, and other defects. Commonly solidification, catalysis of the curing of the resin or of the polymerization reaction proceeds independently of cell formation, which also may cause difficulties.

One type of synthetic resin which it would be desirable to prepare as a cured foam is that prepared by interacting a solution of (1) a polyanhydride obtained by free radical initiation of the reaction between maleic anhydride and an alpha-olefin and (2) a saturated or olefinically unsaturated monoepoxide. The same difficulties as mentioned above may be encountered, however, when utilizing prior art procedures.

It has now been found that such polyanhydride-monoepoxide resins may be prepared in the form of a solid foam by utilizing the curing agent therefor, a tertiary amine, in the dual functions of simultaneously curing the resin and decomposing an added agent, maleic anhydride, to produce a gas which foams the resin.

This improvement may be stated as including a foamable flowable solution comprising
A. A polyanhydride copolymer of
1. a straight-chain alpha-olefin having
between three and about 20 carbon atoms, and
2. maleic anhydride
B. a liquid monoepoxide, and
C. maleic anhydride
the ratio of monoepoxide to polyanhydride being such that the anhydride to epoxide equivalents ratio between these two materials is from about 0.45:1 and 0.65:1, and the quantity of maleic anhydride is between about 1 percent and 20 percent by weight of the polyanhydride-monoepoxide solution.

In greater particularity, the solution also contains a tertiary amine, and preferably a finely divided solid inorganic material which functions in a manner analogous to the well-known "-boiling chips" to produce fine bubbles. The invention also includes the method of forming the foamed plastic and the resulting article.

The solid polyanhydride is prepared by the copolymerization of maleic anhydride with an alpha-monoolefin represented by the general formula I below:

Formula I

where R is a straight chain alkyl radical having from one to about 18 carbon atoms, more preferably from four to 18 carbon atoms.

It is understood that the term "olefin" is meant to include mixtures of monoolefins such as those obtained by the thermal or catalytic cracking of petroleum stocks. While only one olefinic bond per molecule is present in the olefin, since more than one double bond per molecule promotes gel formation and internal cross-linking, minor amounts of diolefins, on the order of 2 percent or less, can be tolerated.

Examples of olefin compounds or mixtures of olefins suitable to form the solid polyanhydride components of the compositions of this invention include:

| | |
|---|---|
| 1-propene; | 1-decene; |
| 1-butene; | 1-undecene; |
| 1-hexene; | 1-dodecene; |
| 1-pentene; | 1-tridecene; |
| 1-heptene; | 1-tetradecene; |
| 1-octene; | 1-nonadecene; |
| 1-nonene; and mixtures thereof. | |

One possible structure of the copolymer of hexene-1 and maleic anhydride as is follows:

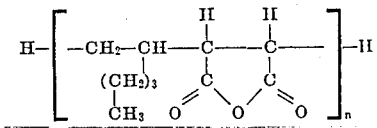

wherein $n$ is from 2 to about 100, or higher, and preferably from 2 to about 30. The foregoing assumes no additional polymerization of like monomers, which of course can take place with suitable monomers and conditions. It is to be understood that either or both of the terminal groups in the foregoing formula may be derived from any components in the reaction mixture.

A more general empirical formula is as follows:
Formula III

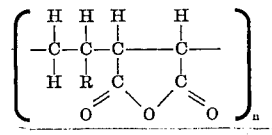

wherein $n$ is an integer of from 2 to about 100 and R is as defined above.

The copolymerization can be conducted in any suitable manner. One suitable copolymerization procedure involves contacting the olefinic compound with the maleic anhydride in a suitable solvent in the presence of a free radical producing catalyst, such as a peroxide. The molar ratio of the mono-alpha-olefin to maleic anhydride is desirably between about 1:1 and 3:1.

The temperature at which the copolymerization occurs is not critical and can generally vary between about 25° and 100° C. with a preferred reaction temperature between about 65° and 85° C. The lower limit on reaction temperature is determined by the temperature required to decompose the catalyst into free radicals. Thus, the lower reaction temperature will depend to a large extent on the catalyst employed. However, most free radical producing catalysts, such as the peroxides and others described below, are effective at temperatures as low as 25° C. unless a promoter, such as a ferrous, silver, sulfate or thiosulfate ion, is used, in which case much lower temperatures, i.e. −80° C. can be employed The upper reaction temperature is determined by the boiling point of the components of the reaction mixture and the predominance of unwanted side reaction.

The reaction pressure should be sufficient to maintain the solvent in the liquid phase. Increased pressure, however, in addition to being an added expense, also promotes unwanted side reactions, such as polymerization of the olefinic compound. Pressures can therefore vary between about atmospheric and 100 p.s.i.g., or higher, but the preferred pressure is atmospheric.

The copolymers can be produced in any suitable solvent which at least partially dissolves both of the reaction components. Suitable solvents include, for example:

| | | |
|---|---|---|
| methylene n-pentane; | tetrahydrofuran; | methylene chloride; |
| n-hexane | carbon tetrachloride; | cyclohexane; |
| n-octane; | n-propylacetate; | diisopropyl ether; |
| toluene; | ethylbenzene; | methylcyclohexane; |
| benzene; | di-n-butylether; | ethyl-n-butyrate; |
| cumene; | n-amylacetate; | tetrachloroethylene; |
| xylene; | cyclohexanone; | methylorthotolyether; |
| anisole; | bromobenzene; | methylethylketone; |
| acetone; and | ethylbenzylether. | |

The catalyst employed is any free radical producing material well known in the art. Preferred catalysts are the organic peroxides, such as benzoyl, lauroyl and tertiary butyl peroxide. Other suitable free radical producing materials include substituted azo compounds, such as alpha-alpha'-azobisisobutyronitrile.

The molecular weight of the polyanhydride component of the compositions of this invention, as indicated by the inherent viscosity (which is a measure of molecular weight) of 5 grams of the polyanhydride per deciliter of acetone at 77° F. is preferably between about 0.75 and 3.0. Lower or higher values may be used.

The composition of this invention also comprises any monooxirane compound containing as its only functional group a single oxirane oxygen atom and optionally at least one olefinic double bond. By a functional group is meant a group such as an oxirane oxygen atom which would participate in the anhydride-monoepoxide cross-linking reaction, i.e. combine chemically with the anhydride, such as, for example, —OH, —SH, and —NH groups. By an oxirane oxygen atom is meant an oxygen atom directly connected to two carbon atoms which carbon atoms are connected to each other, i.e.

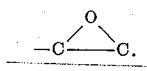

A monooxirane compound is frequently termed a monoepoxide. One preferred class of saturated (i.e. containing no olefinic unsaturation) liquid organic monooxirane compounds can be represented by the general formula V below:

Formula V

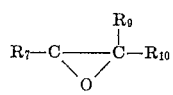

wherein $R_7$, $R_8$, and $R_9$ are selected from the group consisting of hydrogen, a hydrocarbon radical as defined below, and a substituted hydrocarbon radical as defined below, and —OR, where R is any hydrocarbon radical as defined below; and $R_{10}$ is selected from the group consisting of a hydrocarbon radical as defined below, a substituted hydrocarbon radical as defined below and —OR, where R is any hydrocarbon radical as defined below.

By the term "hydrocarbon radical" as used herein is meant any group of atoms consisting of carbon and hydrogen, such as alkyl, preferably saturated, having from one to about 20 or more carbon atoms, cycloalkyl, preferably saturated, having from four to about 20 or more carbon atoms, and aryl, alkaryl, and aralkyl having from six to about 30 or more carbon atoms. By the term "substituted hydrocarbon radical" is meant hydrocarbon radicals as defined above, but where one or more atoms therein have been exchanged for a halogen; —C N; OR group where R is any hydrocarbon radical as defined above, or

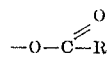

where R is any hydrocarbon radical as defined above.

The preferred saturated oxirane compounds are the so-called terminal monoepoxides which are represented by the above formula V when $R_7$ and $R_8$ are hydrogen. When terminal epoxides are used, it is preferred that $R_{10}$ be selected from the group consisting of phenyl, —OR where R is as defined above, saturated aliphatic radicals having between one and 18 carbon atoms, and halogen substituted alkyl groups.

As noted above, the oxirane compound must be liquid at room temperature in order to dissolve the solid polyanhydride compounds defined above. Examples of suitable saturated oxirane compounds include:

methyl glycidyl either; butyl glycidyl ether;
octylglycidyl ether; phenyl glycidyl ether;
allyl glycidyl ether (unsaturation inactive);
isopropyl glycidyl ether; 1,2-epoxy propane;
1,2-epoxy butane; 1,2-epoxy hexane;
1,2-epoxy decane; cyclohexane oxide;
7,8-epoxy hexadecane; 1,2-epoxy dodecane;
1,2-epoxy octadecane; 1,2-epoxy triacontane;
1,2-epoxy eicosane; 1,2-epoxy tetracontane;
glycidyl benzoate; glycidyl acetate;
limonene oxide; 3,4-epoxy hexane;
1,2-epoxy-7-propyldecane; 1,2-epoxy-5-chlorododecane;
2,3-epoxy-2-phenylhexane; 1,2-epoxy-3-chlorobutane;
monoepoxidized soy bean oil; 1,2-epoxy-2-phenoxypropane; 1,2-epoxy-2-butoxypropane; 2,3-epoxy-2,3-dimethylbutane;
2-propyloctyl glycidyl ether; 3-methylpent-1-ene-glycidyl ether;
1,2-epoxy-2-chloropropane (epichlorohydrin);
2,3-epoxy-2,4-dimethyl-4-chlorobutane;
1,2-epoxy-3-bromopropane (epibromohydrin);
monoepoxidized 2-ethylhexyl tallate; and
glycidyl-para-methylbenzoate.

The most preferred oxirane compounds are styrene oxide, epichlorohydrin, 1,2-epoxy-2-phenoxypropane, 1,2-epoxy-2-butoxypropane, and epoxidized straight chain alpha-monoolefins having between three and 20 carbon atoms per molecule such as 1,2-epoxypropane; 1,2-epoxybutane and 1,2-epoxyoctane; 1,2-epoxydodecane; and 1,2-epoxy eicosane.

The monooxirane compound may also contain at least one, and preferably only one, olefinic double bond. Preferably the olefinic double bond should be one capable of being polymerized by free radical means. By free radical means, in this application, is meant thermal means, i.e. heat, ultraviolet light, radiation and well-known free radical chemical initiators, such as organic peroxides, azo compounds, etc., as mentioned above. The liquid monooxirane compounds are preferred. Suitable ethylenically unsaturated monooxirane compounds are those which contain, in addition to the single oxirane oxygen, at least one terminal

grouping.

The alpha-olefinically unsaturated monooxirane compounds contain substituents directly connected to the beta carbon atom of the alpha-olefin, which substituents result in a net electron withdrawal from the alpha-olefin double bond. In other words, the alpha-olefin double bond is activated for polymerization by substituents or groups which affect an electron withdrawal from the olefinic double bond. Electron withdrawing groups are well known in the art and include, for example, halogen;

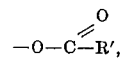

where R' is any organic radical; —C≡N; an aromatic organic radical;

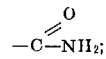

—CH=CH₂; and

wherein R' is any organic radical. Substituents or groups which donate electrons are undesirable, but can be used if the net effect of the two substituents on the beta carbon atom of the alpha-olefin is to effect an electron withdrawal and result in a monomer which is capable of polymerization by free radical means. Substituents which donate electrons are also well known in the art and include, for example, —OR', where R' is any organic radical; —CR$_{30}$R$_{31}$R$_{32}$, where R$_{30}$, R$_{31}$ are selected from the group consisting of hydrogen and any organic radical. For example,

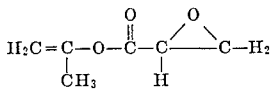

contains an electron donating group (—CH$_3$) and an electron withdrawing group

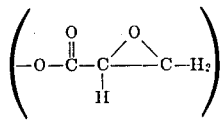

of about equal power on the beta carbon atom. This compound is therefore unsuitable because the net effect is that there is no electron withdrawal from the double bond. In a similar manner, allyl glycidyl ether i.e.

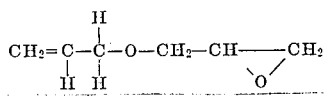

is not a suitable monooxirane compound for the compositions of this invention since the

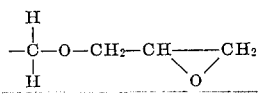

group donates electrons to the double bond. On the other hand, compounds having the general formula:

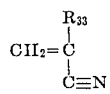

where R$_{33}$ is an alkyl group containing a single oxirane oxygen atom, will readily polymerize even though R$_{33}$ is an electron donating group because —C≡N is such a strong electron withdrawal group that the net effect, i.e. the summation of the electron donating power of the R$_{33}$ group and the electron withdrawal power of the —C≡N group is that electrons tend to be withdrawn from the olefinic double bond, thus activating it for polymerization. As a further example, a compound such as

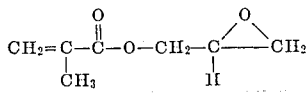

will readily polymerize even though the beta carbon atom contains the electron donating methyl group, since again the electron withdrawal power of the

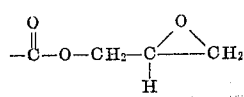

group is greater than the electron donating power of the CH$_3$ group.

The alpha-olefinically unsaturated terminal monoepoxides are represented by the general formula:
Formula VI

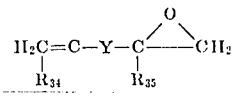

where R$_{35}$ is selected from the group consisting of hydrogen and a saturated hydrocarbon radical having between one and 10 carbon atoms; where R$_{34}$ is selected from the group consisting of hydrogen; halogen; —C≡N;

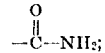

—COOR", where R" is any saturated hydrocarbon radical having between one and 10 carbon atoms; and

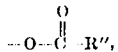

where R" is as defined when Y is selected from the group consisting of

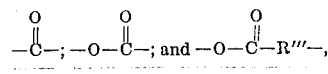

where R'" is any divalent hydrocarbon radical having between one and 20 carbon atoms; and where R$_{34}$ is selected from the group consisting of a saturated hydrocarbon radical having between one and 10 carbon atoms; hydrogen; halogen; —C≡N;

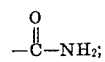

—COOR", where R" is as defined; and

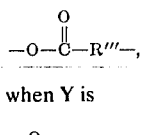

where R'" is as defined when Y is

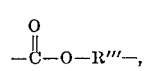

where R'" is any divalent hydrocarbon radical having between one and 20 carbon atoms.

In general, the total number of carbon atoms in the monooxirane compound is suitably between four and 30, and preferably between four and 10 carbon atoms per molecule. The total number of carbon atoms in the preferred monooxirane compound should be such that the compound is liquid at about room temperature. Examples of suitable compounds include, but are not limited to:
glycidyl methacrylate; 3,4-epoxybutene-1;
glycidyl acrylate; 3,4-epoxy-3-chloro butene-1;
glycidyl propacrylate; 3,keto-4,5-epoxy pentene-1;
2-methyl-3-keto-4,5-epoxy pentene-1; allyl glycidyl ether;
2-cyano-3-keto-4,5-epoxy pentene-1; 3,4-epoxyhexene-2;
3-keto-4-methyl-4,5-epoxy pentene-1; cyclohexene oxide;
epoxy ethyl propenoate

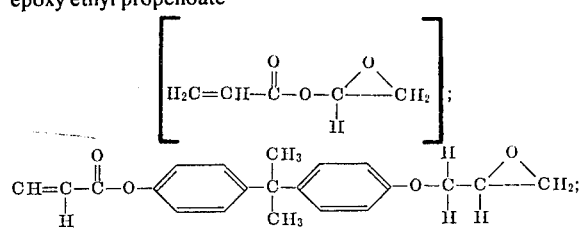

2-methyl-2,3-epoxy propyl acrylate;
2-decyl-2,3-epoxy propyl acrylate;
4-methyl-4,5-epoxy pentyl acrylate;
4-methyl-4,5-epoxy pentyl methyl acrylate;

2-methyl-2,3-epoxy propyl methyl acrylate;
vinyl 3,4-epoxy butanoate

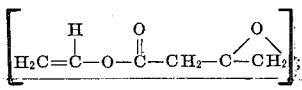

vinyl 3-methyl-3,4-epoxy butanoate; and
vinyl 7,8-epoxy octanoate.

When the monoepoxide is unsaturated, that is when the monoepoxide contains one or more olefinic double bonds, the unsaturation should, of course, be such that the unsaturated monoepoxide will not homopolymerize under the conditions of curing to form a di- or polyepoxide before the monoepoxide cross-links with the polyanhydride.

The prime criteria for the compositions of this invention is the solubility of the solid polyanhydride and of the maleic anhydride in the liquid monoepoxide to form a solution which is liquid at about room temperature, i.e., at temperatures between about 10° and 30° C. A solution is required in order to obtain a hard, infusible resin which is nongrainy and has excellent solvent resistance properties together with good flexural strength and heat distortion temperatures. The time for solution of the polyanhydride in the monoepoxide varies depending on the ratio of the materials in the mixture, the temperature and, of course, the nature of the materials themselves. Thus, while the anhydride to epoxide ratio (A/E ratio) in the final mixture can vary between about 0.45 to 1 and 0.65 to 1, faster solution of the polyanhydride will occur at the lower A/E ratios. More will be said of this A/E ratio below. In addition, it is sometimes desirable to heat the monoepoxide, the maleic anhydride, and the polyanhydride to affect a faster solution. Since the use of increased temperature promotes cross-linking and solidification, the temperatures during this premixing are suitably maintained below about 90° C. and preferably between 50° and 60° C. In any event, the solution on cooling to room temperature must still be liquid.

As noted above, the compositions of this invention are liquid solutions of the defined polyanhydride and maleic anhydride in the defined monoepoxide at room temperature, i.e. at temperatures between about 10° and 30° C. If these solutions were left to stand long enough, they would cross-link to form a hard, infusible resin. Fortunately, the rate of solution of maleic anhydride and the defined polyanhydrides is faster than the rate of cross-linking at the solution temperatures defined above. That the polyanhydride should cross-link at all using the monoepoxide as a cross-linking agent was surprising. This is so because all polyanhydrides will not react to form hard infusible resins using a monoepoxide as the cross-linking agent. For example, pyromellitic dianhydride (PMDA), a commercially available dianhydride, will not react using a monoepoxide as the sole cross-linking agent to form a clear, nongrainy hard infusible resin. PMDA and other similar polyanhydrides will apparently not work because they are substantially insoluble in the liquid monoepoxides. It is critical, therefore, that the defined polyanhydrides be soluble in the defined liquid monoepoxides at about room temperature to form a liquid solution.

It has been found that when straight chain alpha-olefins are employed to prepare the monomeric oxirane compound (monoepoxide) by epoxidation and the solid polyanhydrides are prepared by the copolymerization of maleic anhydride and straight chain alpha-olefins, the size of the straight chain alpha-olefin used in preparing the monoepoxide and polyanhydride becomes important in order for the monoepoxide to solubilize the polyanhydride. In general, the solubility of maleic anhydride-alpha-olefin copolymers increases as the carbon number of the alpha-olefin increases. In addition, the solvent power or ability of the monoepoxide to solubilize the polyanhydride decreases as the carbon number of the alpha-olefins used to prepare the monoepoxide increases. For example, propylene oxide and butylene oxide appear to be suitable solvents for substantially any maleic anhydride alpha-olefin copolymer. On the other hand, when the monoepoxide is prepared by the epoxidation of a straight chain alpha-olefin having light carbon atoms or more per molecule, the straight chain alpha-olefin used to prepare the polyanhydride must have at least eight carbon atoms per molecule. In any event, in order to form the compositions of this invention, the maleic anhydride and the polyanhydride must be substantially completely dissolved in the liquid monomeric oxirane compound to form a liquid solution at about room temperature before solidification of the mixture of the anhydrides and monoepoxide.

The ratio of the polyanhydride to monoepoxide compound employed in the compositions of this invention varies over a limited critical range. The specific ratio to employ with any given polyanhydride or monoepoxide is determined, first of all, by whether a liquid solution of the polyanhydride in the monoepoxide is obtained at room temperature. The liquid solution of polyanhydride in the monoepoxide hardens by a cross-linking reaction, and the reaction product is a network of ester and ether linkages having substantially no carboxylic acid groups therein. The ester linkages are believed to form through the interaction of the anhydride and epoxide groups while the ether linkages are believed to form through the interaction of several epoxide groups. Where the liquid organic monomeric oxirane compound contains only one oxirane oxygen atom as its only functional group, one equivalent of the monooxirane compound is equivalent to 1 mole.

The anhydride equivalent of the polyanhydride is defined as the average number of anhydride groups per molecule. In order to form thermosetting compositions, the polyanhydride must have an anhydride equivalency of at least two, that is, the polyanhydride must have at least two anhydride groups per molecule. The polyanhydride group to epoxide group ratio, known more simply as the A/E ratio, is critical and can vary between about 0.45:1 and 0.65:1, but is preferably between about 0.5:1 and 0.55:1.

As used herein, the A/E ratio refers only to the ratio of the anhydride/epoxide groups of the polyanhydride and the monooxirane compound, unless otherwise so specified. The amount of added maleic anhydride blowing agent is based on the total weight of the epoxide, polyanhydride and maleic anhydride (excluding the weight of the amine cure accelerator). This quantity of monoanhydride is between about 1 percent and 20 percent, more preferably between about 5 percent and 15 percent.

One of the features of the liquid compositions of this invention is that they can be cross-linked or cured at relatively low temperatures and pressures. A hardening or curing of the resins can suitably be initiated at a temperature between about 0° C. and 110° C. at atmospheric pressure. Higher pressures can be used if desired, but provide no additional benefits. Higher curing temperatures, for example up to 200° C. or more, can be used, but higher temperatures promote evaporation of one or the other of the components of the composition resulting in undesirable large bubble formation or other difficulties. The preferred temperatures for initiating curing are between 10° C. and 30° C. Curing may take place in two stages, a first stage at a low temperature, and a second stage at a higher temperature.

It has been found that the curing or cross-linking reaction can be accelerated by the use of various materials. Several Friedel-Crafts type salts, such as ferric chloride and lithium chloride, while accelerating the production of a solid product, are undesirable in that they are insoluble in the polyanhydride-monoepoxie system and, in addition, result in a solid which is softer than desired. Other materials, such as $BF_3$ complexes, salts or tertiary amines, picolinic acid and concentrated $NH_4OH$, while soluble in the monoepoxide system are undesirable in that the cured products are softer than desired.

Primary and secondary amines, concentrated HCl NaOH and oxalic acid either do not function at all as accelerators or react with the polyanhydride-monoepoxide to form undesirable products.

It has been found that soluble tertiary amines as a class are unique in accelerating the curing of the compositions of this invention to solids of desired hardness. One suitable class of tertiary amines can be represented by the general formula:

Formula VII

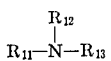

where $R_{11}$, $R_{12}$ and $R_{13}$ can be the same or different and can be selected from the group consisting of a hydrocarbon radical as defined above having between one and 37 carbon atoms, and a substituted hydrocarbon radical as defined above having between one and 37 carbon atoms; and wherein the sum of the carbon atoms in $R_{11}$, $R_{12}$ and $R_{13}$ is less than 40; and wherein the term "alkyl" for $R_{11}$, $R_{12}$ and $R_{13}$ includes both saturated and unsaturated groups. Examples of suitable tertiary amines having the above formula VII include:

trimethyl amine;  N,N-diethylallyamine;

triethylamine;  N,N-di-n-propylaniline;

N,N-dimethylaniline;  N,N-diethyl-o-toluidine;

tri-n-hexylamine;  N,N-diethyl-p-toluidine;

tri-n-heptylamine;  N-ethyl-N-methylaniline;

triphenylamine;  N,N-dimethyl-m-toluidine;

tri-n-decylamine;  N,N-diethyl-m-toluidine;

N,N-diethylaniline;  tri-n-propylamine;

tri-n-butylamine;  tri-isopentylamine;

tri-pentylamine;  trioctylamine;

tridodecyl amine;  N,N-diphenylmethylamine;

N,N-dimethylbenzylamine;  meta-diethylaminophenol;

N,N-dimethyloctadecylamine;

dimethylaminomethylphenol;

alpha-methylbenzyldimethylamine;

N,N-dimethylcyclohexylamine;

N-methyl-N-phenylbenzylamine;

N,N-dimethyl-p-nitrosoaniline;

tridimethylaminomethylphenol;

dimethylaminoethyl

N,N-dimethyl-1-naphylamine;

N,N-dimethyl-1-naphthylamine;

p-bromo-N,N-dimethylaniline;

p-bromo-N,N-diethylaniline;

N,N-diethyl-2,5-dimethylaniline;

N,N-diethyl-2,4-dimethylaniline;

p-chloro-N,N-diethylaniline;

N-benzyl-N-ethyl-m-toluidine;

N,N-alpha-trimethylbenzylamine; and

N,N-dimethyl-2-ethylhexylamine.

Pyridines are also suitable as accelerators and can be represented by the formula VIII below:

Formula VIII

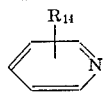

where $R_{14}$ can be selected from the group consisting of hydrogen, a hydrocarbon radical as defined above having between one and 10 carbon atoms, and a substituted hydrocarbon radical as defined above having between one and 10 carbon atoms; and wherein the term "alkyl" includes both saturated and unsaturated groups. Examples of suitable tertiary amines having the above formula VIII include:

Pyridine;  2-allylpyridine;

3-ethylpyridine;  4-ethylpyridine;

2-benzylpyridine;  2-isopropylpyridine;

4-phenylpyridine;  3-bromopyridine;

2-chloropyridine;  vinylpyridine; and 3-picoline.

While the monosubstituted pyridines are preferred, the more highly substituted pyridines can also be employed, such as, for example:

3,5-dicyanopyridine;  3-cyano-4-methylpyridine;

3,5-dimethylpyridine; and  2,4,6-trimethylpyridine.

Examples of other suitable tertiary amines include:

triethylene diamine  N,N-dimethyl-m-nitroaniline;

quinazoline;  N,N-diethyl-m-phenetidine;

quinoxaline;  N,N-diethyl-o-nitroaniline;

Pyrido[3,2-b]pyridine;  phenazine;

pyrido[4,3-b]pyridine;  acridine;

naphthyridine;  1,2,4-benzotriazine;

phthalazine;  phenotriazine;

N,N-diethyl-3,4-dinitroaniline;

N,N,N',N'-tetramethylmethylene diamine;

N,N,N',N'-tetramethyl-1,3-butane diamine; and

N,N,N', N'-tetraethylethylene diamine.

The amount of the tertiary amine accelerator employed is not particularly critical, although the amount must be controlled so that cell formation and curing proceed at the proper rates. Amounts of from 0.5 to 20 parts of amine catalyst per 100 parts of liquid monoepoxide are satisfactory. The preferred range of accelerator concentration is between 0.5 and five parts of amine catalyst per 100 parts of monoepoxide. The more amine catalyst that is used, the faster the rate of cure.

The use of a tertiary amine accelerator and particularly the use of the alkyl substituted anilines and pyridines results in much faster cures.

The method of addition of the tertiary amine accelerators is critical. They must be added to the mixture of anhydrides and monoepoxides after the anhydrides are dissolved in the monoepoxide, since it normally takes longer for the solution of the anhydrides in the monoepoxide than for the amine accelerators to harden the mixture. Consequently, if the amine is added first to the monoepoxide and the anhydrides added to this mixture the composition may harden before all of the anhydrides are dissolved, and a grainy composition with inferior chemical and physical properties will result.

The curing reaction is exothermic, and an important aspect of the invention is the use of the heat generated during curing and cross-linking to cause reaction of the tertiary amine and the added maleic anhydride, which is decomposed to give off carbon dioxide gas simultaneously with the curing reaction. The identity of the amine influences the rate of curing, as well as the rate of decomposition of the maleic anhydride, although amine concentration is probably the more important variable. In some cases, a combination of amines is useful, an example being triethyl amine and N-methylmorpholine. The triethyl amine is fast-acting, but is volatilized at elevated temperatures, at which point the less volatile amine continues to catalyze the cross-linking reaction and decomposition of the maleic anhydride.

The quantity of maleic anhydride added to the polyanhydride-monoepoxide solution is important in that it is related to the amount of carbon dioxide gas evolved. Suitable amounts range from about 1 percent to 20 percent by weight of the polyanhydride-monoepoxide solution, more preferably from about 5 percent to about 15 percent.

The reaction of the maleic anhydride and the tertiary amine may be represented as follows:

$$\text{Maleic Anhydride} + \text{Tertiary Amine} \xrightarrow{\text{heat}} CO_2 + \text{traces of other products.}$$

Probable Mechanism (Anhydrous System)

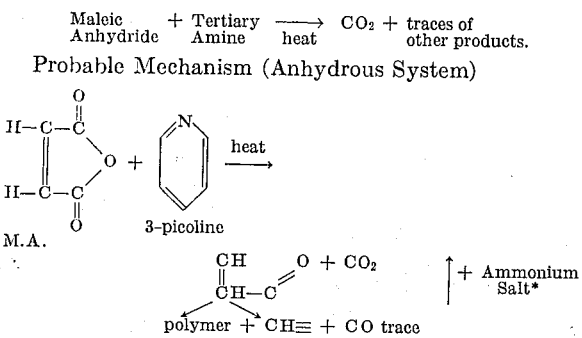

If water is present the maleic anhydride is converted to maleic acid, which in the presence of a tertiary amine and heat, give ethylene and $CO_2$. The foaming occurs as a result of the formation and evolution of $CO_2$ by the chemical decomposition of the maleic anhydride by reaction with the tertiary amine.

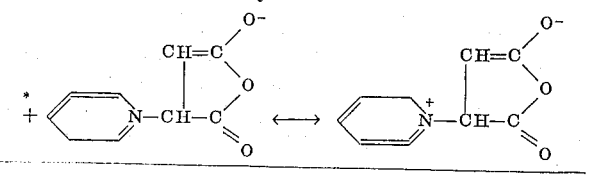

It is preferred that a finely divided inorganic material, such as calcium phosphate dust, $Ca_3(PO_4)_2$ is suspended in the solution to give the "boiling chip" effect and consequent formation of small foam cells. In place of calcium phosphate, pigments, flame retardants such as antimony oxide and the like are useful. If calcium phosphate is used, about 5 percent to 25 percent by weight of the polyanhydride-monoepoxide solution, by weight, is suitable.

The foam product finds utility as refrigeration or other thermal insulation such as pipe and tank insulation, insulated structural slabs, and the like. The foam may be formed in place, sprayed, formed in a closed mold, or by other conventional procedures. As a result of the foaming, the final solid foamed product will have by volume at least 30 percent cell space, and usually will have between 50 and 150 percent cell space. The cell space of the final foamed solid can be as high as 300 to 500 percent. By cell space is meant the amount of volume occupied by the voids in the solid foamed product compared to the amount of volume occupied by the resin. The cell space is measured directly by the increase in volume of the foamed cured solid article compared to the volume of the uncured resin.

The following examples are intended to illustrate the invention but it is not intended to limit the invention thereto.

Example 1

Maleic anhydride and hexene-1, in a molar ratio of 1:1, is dissolved in ethylene dichloride, with about 2 percent benzoyl peroxide. The mixture is heated to a temperature of about 80° C. until polymerization is complete. Heptane is then added to precipitate the polyanhydride which is then filtered from the liquid, which retains excess monomer and residual catalyst. The copolymer containing hexene-1 and maleic anhydride combined in a 1:1 ratio is then dried. It has an intrinsic viscosity (dilute solution viscosity) of 0.10 as determined, by dissolving 5 g. of the polymer in 1 deciliter of acetone, at 77° F.

This polyanhydride copolymer, in the amount of 256 g. is dissolved in 254 g. of epichlorohydrin, giving an A/E ratio of 0.5.

To 40 g. of the resulting solution, 2 grams (5 percent by weight) of maleic anhydride is added, followed by the addition of about 1.6 g. (4 percent by weight of 3-picoline.

The mixture, in a cylinder, foams and cures to a relatively rigid (i.e. nonelastomeric) foam, the increase in volume being 50 percent.

Example 2

The foregoing example is repeated, but with the use of 4 grams (10 percent by weight) of maleic anhydride as the chemical blowing agent. The increase in volume is 300 percent.

Example 3

When 6 g. (15 percent by weight) of maleic anhydride is added to the polyanhydride-epichlorohydric solution, using the procedure of example 1, the increase in volume is 110 percent. When this example is repeated using 6 percent by weight of 3-picoline, the cross-linking and foaming proceed at rates to give a lowered volume increase; in other words, when too large an amount of tertiary amine is used, cross-linking of the resin proceeds so rapidly that maximum foaming cannot take place.

Example 4

The foregoing procedure is repeated, using the following amounts by weight:

100 parts polyanhydride-monoepoxy solution 10 parts maleic anhydride 15 parts tricalcium phosphate 4 parts 3-picoline Curing is initiated at room temperature, as in the foregoing examples. As the reaction proceeds, the following changes take place:

| Reaction Time (Minutes) | Percent Increase In Volume | Density (Lbs./Ft.) |
|---|---|---|
| 0 | 0 | 62 |
| 6 | 40 | 48 |
| 15 | 75 | 37 |
| 20 | 85 | 34 |
| 25 | 100 | 31 |

Example 5

Repeating example 4, but heating the solution to temperatures of 40° C. to 60° C. just prior to addition of the 3-picoline, densities of the order of 10 lbs./ft.$^3$ are obtained.

Resort may be had to such variations and modifications as fall within the spirit of the invention and the scope of the appended claims.

We claim:
1. A foamable flowable solution comprising:
   a polyanhydride copolymer of
      1. a straight chain alpha-olefin having between three and about 20 carbon atoms, and
      2. maleic anhydride and wherein said polyanhydride the molar ratio of the straight chain alpha-olefin to maleic anhydride is from about 1:1 to 3:1;
   B. a liquid monoepoxide containing as its only functional group a single oxirane oxygen atom and optionally at least one olefinic double bond; and
   C. maleic anhydride, the ratio of monoepoxide to polyanhydride being such that the anhydride to epoxide equivalents ratio between these two materials is from about 0.45:1 and 0.65:1, and the quantity of maleic anhydride is between about 1 percent and 20 percent by weight of the polyanhydride-monoepoxide solution.
2. The composition of claim 1 comprising a tertiary amine.
3. The composition of claim 2 in which the monoepoxide contains a single oxirane group as the sole functional group.
4. The composition of claim 2 in which the monoepoxide compound contains a single oxirane group and a single olefinic double bond capable of polymerization by free radical means as the only functional groups.
5. The composition of claim 1 in which said olefin contains no more than about 12 carbon atoms.
6. An article of manufacture comprising a solid foam comprising the interaction product of
   A. a copolymer of
      1. a straight chain alpha-olefin having between three and about 20 carbon atoms, and
      2. maleic anhydride and wherein said copolymer the molar ratio of the straight chain alpha-olefin to maleic anhydride is from about 1:1 to 3:1, and
   B. a liquid monoepoxide containing as its only functional group a single oxirane oxygen atom and optionally at least one olefinic double bond; and
   C. maleic anhydride said article having, by volume, at least about 30 percent cell space.
7. A method of preparation of a foamed plastic article comprising
   A. forming a liquid solution of a solid polyanhydride in a liquid monoepoxide, said polyanhydride being a copolymer of
      1. a straight chain alpha-olefin having between three and about 20 carbon atoms, and
      2. maleic anhydride and wherein said polyanhydride the molar ratio of the straight chain alpha-olefin to maleic anhydride is from about 1:1 to 3:1; and said liquid monoepoxide containing as its only function group a single oxirane oxygen atom and optionally at least one olefinic double bond, and the ratio of monoepoxide to the polyanhydride being such that the anhydride to epoxide equivalent ratio between these two materials is from about 0.45:1 to 0.65:1; and cross-linking said polyanhydride with said monoepoxide in the presence of a tertiary amine and from 1 to 20 percent by weight of maleic anhydride based on said polyanhydride-monoepoxide solution.
8. A method according to claim 7 wherein the monoepoxide contains a single oxirane group as the sole functional group.
9. A method according to claim 7 wherein the monoepoxide contains a single oxirane group and a single olefinic double bond capable of polymerization by free radical means as the only functional groups.
10. A method according to claim 7 in which said olefin contains no more than 12 carbon atoms.
11. A method according to claim 7 including molding said foamed plastic article during said cross-linking.
12. A method according to claim 7 wherein the amount of maleic anyhydride is from 5 to 15 weight percent.
13. An article of manufacture according to claim 6 comprising in addition the interaction product of maleic anhydride and a tertiary amine.

* * * * *

PO-1050
(5/69)

UNITED STATES PATENT OFFICE
CERTIFICATE OF CORRECTION

Patent No. 3,620,990            Dated November 16, 1971

Inventor(s) Stanley M. Hazen and William J. Heilman

It is certified that error appears in the above-identified patent and that said Letters Patent are hereby corrected as shown below:

Col. 2, line 69 - "methylene n-pentane" should read -- n-pentane --

Col. 3, lines 33-38, the formula which reads

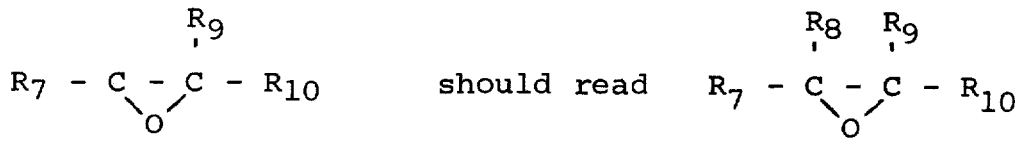

Col. 3, line 55 - "-C N;" should read -- -C≡N; --.

Col. 5, line 2, "where $R_{30}$, $R_{31}$ are selected" should read -- where $R_{30}$, $R_{31}$, and $R_{32}$ are selected --.

Col. 8, line 1, "light" should be -- eight --.

Col. 8, line 65, "hydride-monoepoxie" should read -- hydride-monoepoxide --.

Col. 9, line 53, "dimethylaminoethyl" should read -- dimethylaminoethyl methacrylate --.

Col. 9, line 54, delete "N,N-dimethyl-1-naphylamine;".

Signed and sealed this 27th day of June 1972.

(SEAL)
Attest:

EDWARD M. FLETCHER, JR.        ROBERT GOTTSCHALK
Attesting Officer                  Commissioner of Patents